United States Patent [19]

Motomiya et al.

[11] Patent Number: 4,605,161
[45] Date of Patent: Aug. 12, 1986

[54] PATTERN-SWITCHING TEMPERATURE CONTROL APPARATUS

[75] Inventors: Takehiko Motomiya; Shigeu Ogawa, both of Tokyo, Japan

[73] Assignee: Ohkura Electric Co., Ltd., Tokyo, Japan

[21] Appl. No.: 725,413

[22] Filed: Apr. 22, 1985

[30] Foreign Application Priority Data

Nov. 24, 1984 [JP] Japan ................ 59-247015

[51] Int. Cl.$^4$ ............................................. G05D 23/19
[52] U.S. Cl. ................. 236/15 BC; 219/388; 236/15 BB; 364/557; 432/53
[58] Field of Search ............ 236/15 BC, 15 BB, 78 B; 432/52, 53; 219/388; 364/557

[56] References Cited

U.S. PATENT DOCUMENTS

| 2,518,996 | 8/1950 | Peckham | 236/15 BC |
| 3,956,612 | 5/1976 | Ballard et al. | 219/388 X |
| 4,004,138 | 1/1977 | Morooka et al. | 432/53 X |
| 4,213,023 | 7/1980 | Satoh et al. | 236/15 BB X |
| 4,501,552 | 2/1985 | Wakamiya | 236/15 BB X |

FOREIGN PATENT DOCUMENTS 664158  5/1979  U.S.S.R. ................ 236/15 BC

Primary Examiner—Albert J. Makay
Assistant Examiner—Steven E. Warner
Attorney, Agent, or Firm—Oblon, Fisher, Spivak, McClelland & Maier

[57] ABSTRACT

An apparatus controls the temperature of a multi-zone furnace based on a given temperature distribution pattern, which pattern is automatically modified zone by zone as the work being heat-treated is changed by using a memory storing a series of such patterns for different kinds of works.

9 Claims, 8 Drawing Figures

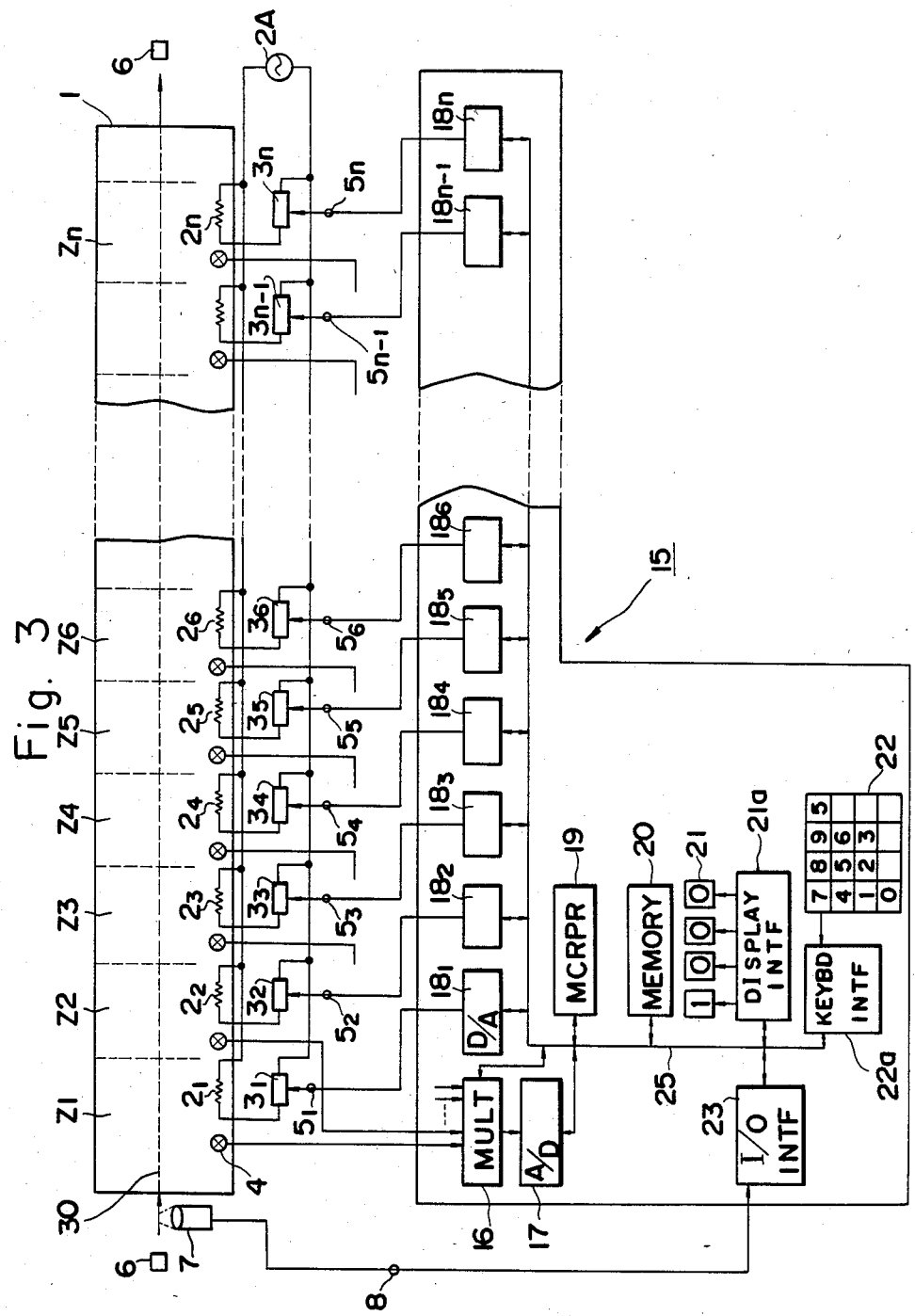

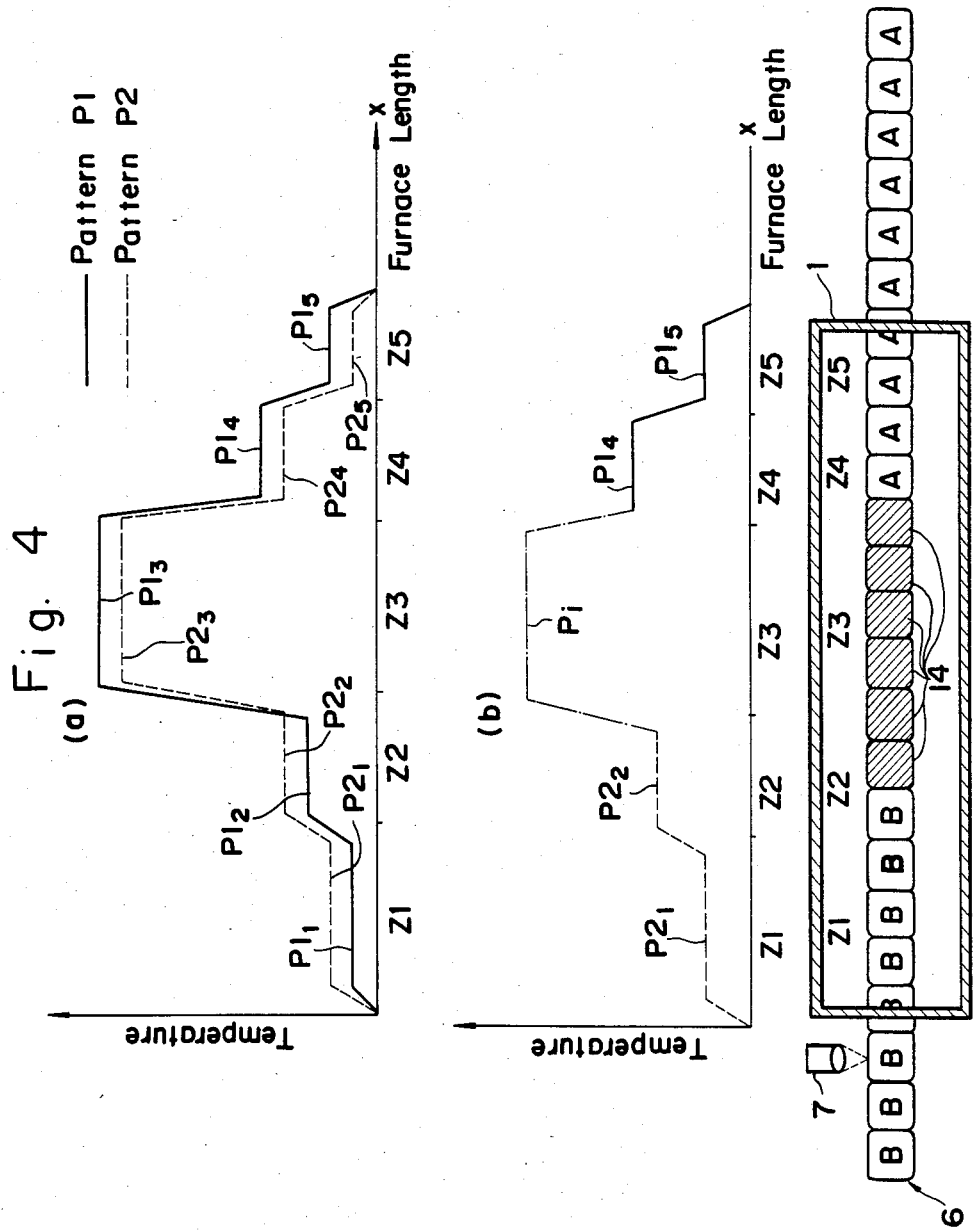

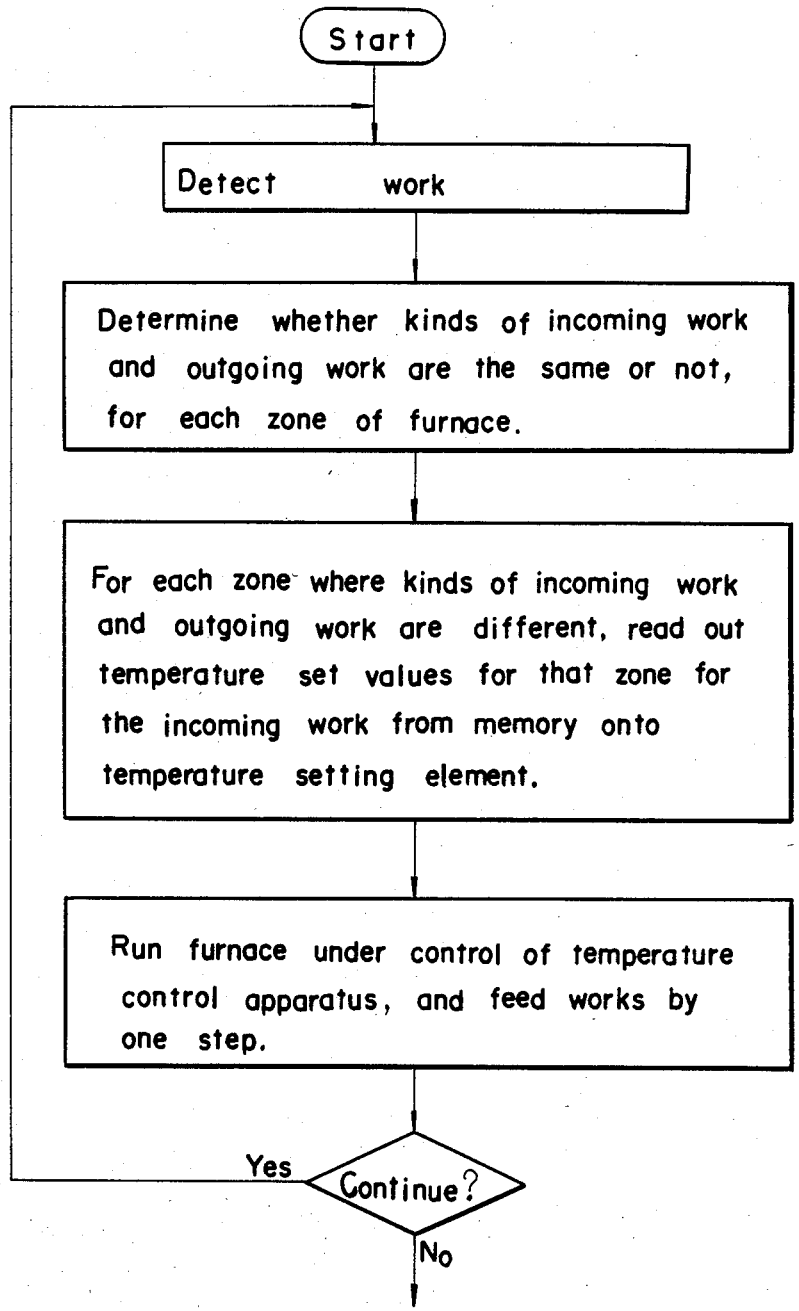

PATTERN-SWITCHING TEMPERATURE CONTROL APPARATUS

BACKGROUND OF THE INVENTION

1. Field of the Invention

This invention relates to a pattern-switching temperature control apparatus for a furnace having a plurality of zones therein for heat-treating works at different temperatures. More particularly, the invention relates to a temperature control apparatus for controlling the temperature distribution in the so-called tunnel furnace which maintains a specific pattern of temperature distribution in the longitudinal direction thereof so as to heat-treat works while moving them therethrough by a conveyor or the like, the temperature control apparatus being adapted to automatically switch the pattern of the temperature distribution in the furnace when the kind of works being heat-treated is changed.

2. Description of the Prior Art

FIG. 2 schematicaly shows a conventional tunnel furnace. The funnace 1 has a plurality of zones Z1, Z2, ..., Zn, and each zone is heated by a heating element 2 such as an electric heater. The heating of the furnace is controlled zone by zone either conitnuously or intermittently by regulating means 3 such as thyristors or other suitable electromagnetic switches. Temperature detecting elements 4, such as thermocouples, are disposed in the individual zones so as to detect the actual zone temperatures and communicate the detected temperatures to controllers 28A, 28B, . . . , 28N which are associated with the furnace zones respectively. Each controller has an arithmetic-logic unit 27A which compares the thus communicated actual zone temperature against the set value on a temperature setting element 27 thereof, and the unit 27A generates a control signal 5 based on the result of the comparison.

Each control signal 5 is applied to the regulating means 3 of the associated furnace zone, so as to regulate the energy supply to the heating element 2 of the furnace zone from an energy source 2A until the control signal 5 is reduced to nil, i.e. until the actual zone temperature is brought to the set value of the zone temperature. In case that the regulating means 3 are thyristors or other electromagnetic switches and the power source 2A is an electric power source, the control signals 5 regulate the making and breaking of the electric circuits through the regulating means 3.

The above temperature control brings about an overall temperature distribution pattern in the furnace 1, such as that of the solid line curve Pa of FIG. 2. Works 6 are heat-treated as they are moved through the furnace 1 as shown by the arrow 30 while maintaining the desired temperature distribution patterrn therein.

Application of the arrangement of FIG. 2 is not restricted to electric furnaces. For instance, when the furnace 1 is heated by gas, the arrangement can be similarly applied to it by using the heating element 2 made of a gas burner, the regulating means 3 made of a valve, and the energy source 2A formed of a gas supply source.

To heat-treat different kinds of works 6, the temperature distribution pattern in the furnace 1 must be adjustable depending on the shape, size, an other properties of the works 6. In the case of heat-treating a large variety of different works 6 in small quantity, the temperature distribution pattern in the furnace 1 must be adjusted or switched rather frequently. In conventional temperature controllers, the setting elements 27 of the controllers 28A through 28N are manually controlled to switch the temperature distribution patterns, for instance from that of the solid line curve Pa of FIG. 2 to that of the dotted line curve Pb thereof. However, such manual control of the prior art has shortcomings in that it is not only time-consuming but also inaccurate.

Further, in the conventional apparatus, the desired temperature distribution pattern in the furnace 1 cannot be obtained quickly after changing the set values of the setting elements 27 and a certain time lag is inevitable before the desired temperature distribution pattern is produced and stabilized in the furnace 1. Accordingly, a waiting period is required before forwarding works 6 into the furnace 1 each time the temperature distribution pattern is changed.

SUMMARY OF THE INVENTION

Therefore, an object of the present invention is to automate the switching of the temperature distribution patterns in the tunnel furnace in response to change in the kind of works to be heat-treated therein.

Another object of the invention is to facilitate automatic setting of optimal parameters for controlling the furnace temperature depending on the absolute level of the temperature and the kind of works to be heat-treated therein.

To fulfill the above objects, a preferred embodiment of the pattern-switching temperature control apparatus according to the invention uses a combination of a memory, a temperature setting element, a counting means, a setting means, and a regulating means, so as to control the temperature in a furnace made of a number of zones, each zone having a temperature detecting element and a heating element mounted thereon.

The memory stores a series of temperature distribution patterns and a series of numbers, each of which numbers represents a predetermined quantity of works of one kind to be heat-treated at corresponding one of the temperature distribution patterns. The temperature setting element carries set values of one temperature distribution pattern at a time as read out from the memory on a zone-by-zone basis. The counting means counts the number of works of one kind which have been heat-treated at one said temperature distribution patterns. When the count of the counting means increases and coincides with the predetermined quantity of the one kind works, the setting means rests the counting means to zero and places a next succeeding temperature distribution pattern on the temperature setting element from the memory. The regulating means controls the heating element so as to minimize the difference between the set value on the temperature setting element and actual temperature detected by the temperature detecting element zone by zone.

To speed up the change of temperature in the furnace, control parameters for each kind of works may be stored in the memory and the setting means may read out the control parameters from the memory onto the regulating means each time the temperature distribution pattern is read.

When the temperature distribution pattern is switched, it is desirable to start the heat treatment of next succeeding kind of works as soon as the desired temperature distribution pattern is established. To this end, dummy bodies whose number depends on the length of time necessary for the establishment of the new temperature distribution pattern may be inserted between one kind of works and the next succeeding kind of works, so that the works may be be moved through the furnace without interruption even when the temperature distribution pattern is switched. Preferably, such number of dummy bodies is also stored in the memory in proper relation with the numbers of the works to be heat-treated.

If the dummmy bodies are used, a selective driving means may be included in the temperature control apparatus of the invention, so as to selectively forward either works or dummy bodies to the furnace depending on whether the above counting means counts up either dummy bodies or works.

To ensure the correct temperature at furnace entrance, the temperature control apparatus of the invention may include a temperature comparing means adapted to determine difference between the set value of the furnace inlet end temperature of the newly selected temperature distribution pattern and actual temperature thereat as measured by the temperature detecting element. In this case, the selective driving means forward dummy bodies to the furnace as long as the temperature difference thus determined by the temperature comparing means is larger than a certain preset value.

The pattern-switching temperature control apparatus of the invention can be designed in the form of multi-loop type using one overall controller or in the form of single-loop type using a number of controllers individually assigned to different zones of the furnace.

BRIEF DESCRIPTION OF THE DRAWINGS

For a better understanding of the invention, reference is made to the accompanying drawings, in which:

FIG. 3 is a schematic block diagram of a practical example of the pattern-switching temperature control apparatus according to the invention for controlling the heat-treating temperature of a tunnel furnace;

FIG. 4 shows curves and a diagram which are used in the description of the invention;

FIG. 8 is a flow chart of the operation of the temperature control apparatus of the invention.

Like parts are designated by like numerals and symbols throughout different views of the drawings.

DESCRIPTION OF THE PREFERRED EMBODIMENT

Figure 1:
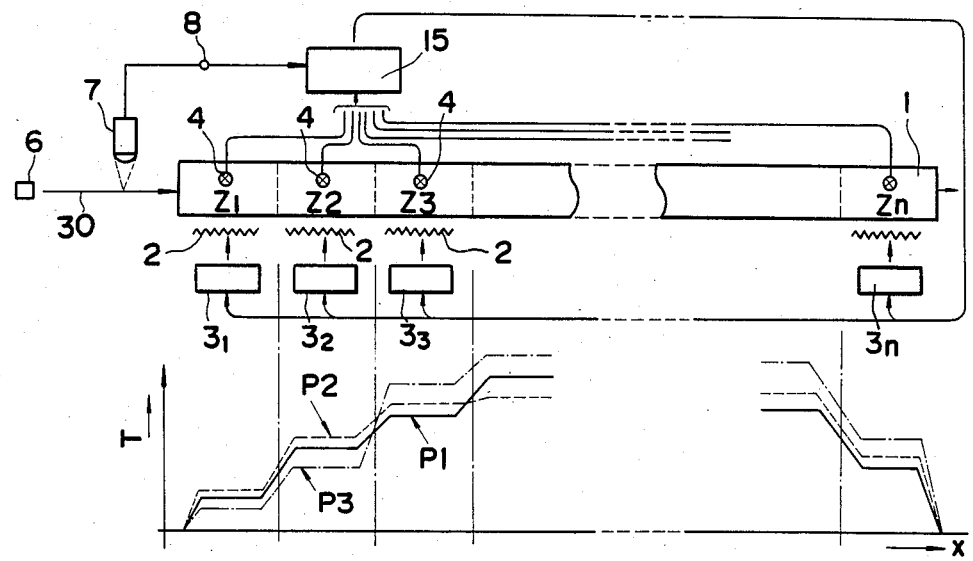
FIG. 1 is a diagrammatic illustration of a pattern-switching temperature control apparatus according to the invention, which apparatus suits to temperature control of a tunnel furnace.
Figure 7:
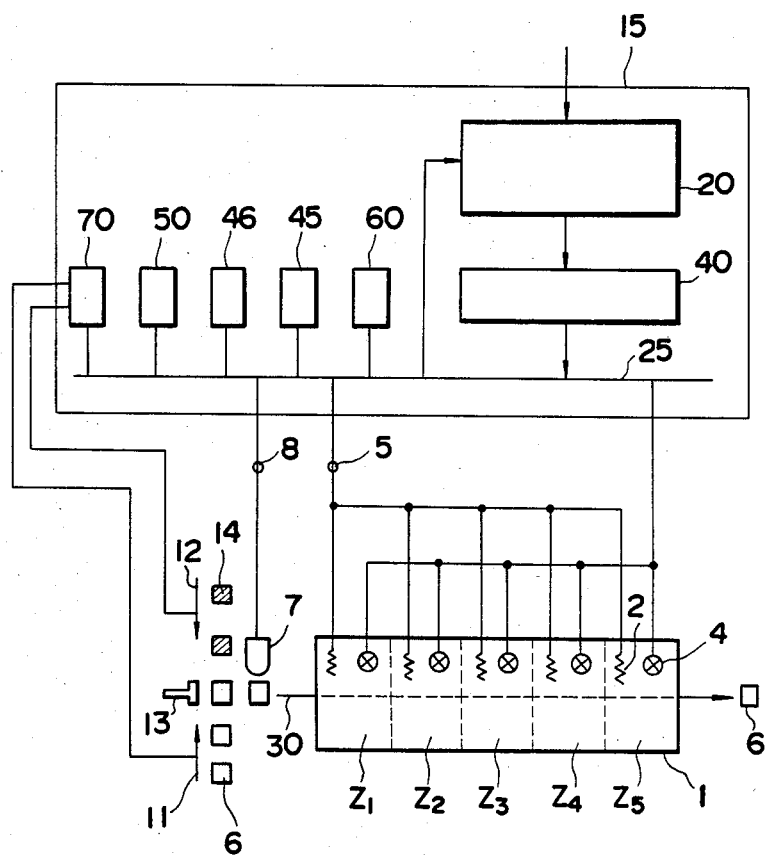
FIG. 7 is a block diagram showing the relationship among different functional means in the apparatus according to the invention.

Referring to FIG. 1 and FIG. 7, a pattern-switching control apparatus 15 according to the invention controls the temperature in a furnace 1 having a plurality of zones Z1, Z2, ... Zn, each having a heating element 2 and a temperature detector 4. The temperature control apparatus 15 has a memory 20 for storing a series of temperature distribution patterns, such as the patterns P1, P2, P3 of FIG. 1, each pattern consisting of those temperatures of individual zones Z1 through Zn which are suitable for heat-treating a specific kind of work 6. The memory 20 also stores prescribed numbers, each of which numbers represents the quantity of one kind works 6 to be heat-treated at the corresponding one of the temperature distribution patterns stored therein.

For example, in the case of a furnace 1 having five zones Z1, Z2, Z3, Z4, and Z5, each temperature distribution pattern has five portions indicating the temperatures of the corresponding zones, such as five portions $P1_1$, $P1_2$, $P1_3$, $P1_4$, and $P1_5$ for the temperature distribution pattern P1, and five portions $P2_1$, $P2_2$, $P2_3$, $P2_4$, and $P2_5$ for the temperature distribution pattern P2 as shown in FIG. 4.

A work detector 7 disposed in front of the inlet of the furnace 1 detects each work 6 moving toward the furnace 1 and generates a work signal 8 for each work 6. The work signal 8 is sent to the temperature control apparatus 15 in synchronism with the movement of the works 6 toward the furnace 1. A counting means 45 counts the work signals 8. When the count of the counting means 45 for a certain furnace temperature distribution pattern, e.g., P1, coincides with the presecribed number of the works 6 to be heat-treated at the furnace temperature distribution pattern P1, which number is stored in the memory 20, a setting means 60 resets the count of the counting means 45 to zero and reads out the next succeeding furnace temperature distribution pattern, e.g., P2, from the memory 20 to a temperature setting element 40. In ths case, it is important in the present invention to read the new temperature distribution pattern, e.g., P2, zone by zone in synchronism with the advancement of the works 6 in the furnace 1.

the temperature control apparatus 15 includes a control means 50 for individually regulating the heating elements 2 of the zones Z1 through Zn depending on the deviation of the temperature detected by the temperature detecting means 4 of each zone from the set value of the temperature distribution pattern for that zone. The set value is read out from the memory 20 onto the teperature setting element 40 zone by zone as explained above.

Preferably, optimal control parameters for each kind work 6 are stored in the memory 20 zone by zone. The control parameters are, for instance, proportional gain, derivative action time constant, and integral action time constant for proprtional plus integral plus derivative (P.I.D.) control action, but the control parameters are not limited to such gains and time constants. When the counting means 45 counts up the prescribed number of the works 6 to be heat-treated, the regulating means 50 preferaly reads the control parameters for the next following kind of works 6 from the memory 20 and places them on the regulating means 50 by the setting means 60.

Figure 5:
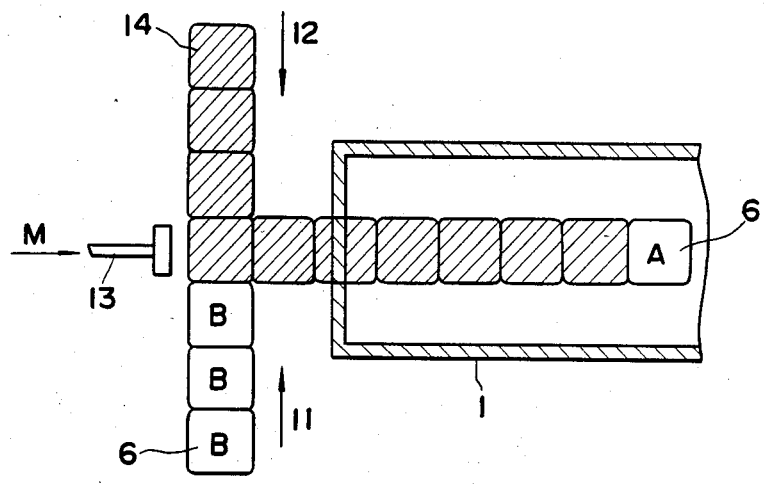
FIG. 5 is an explanatory diagram of a work line and a dummy line.
Figure 2:
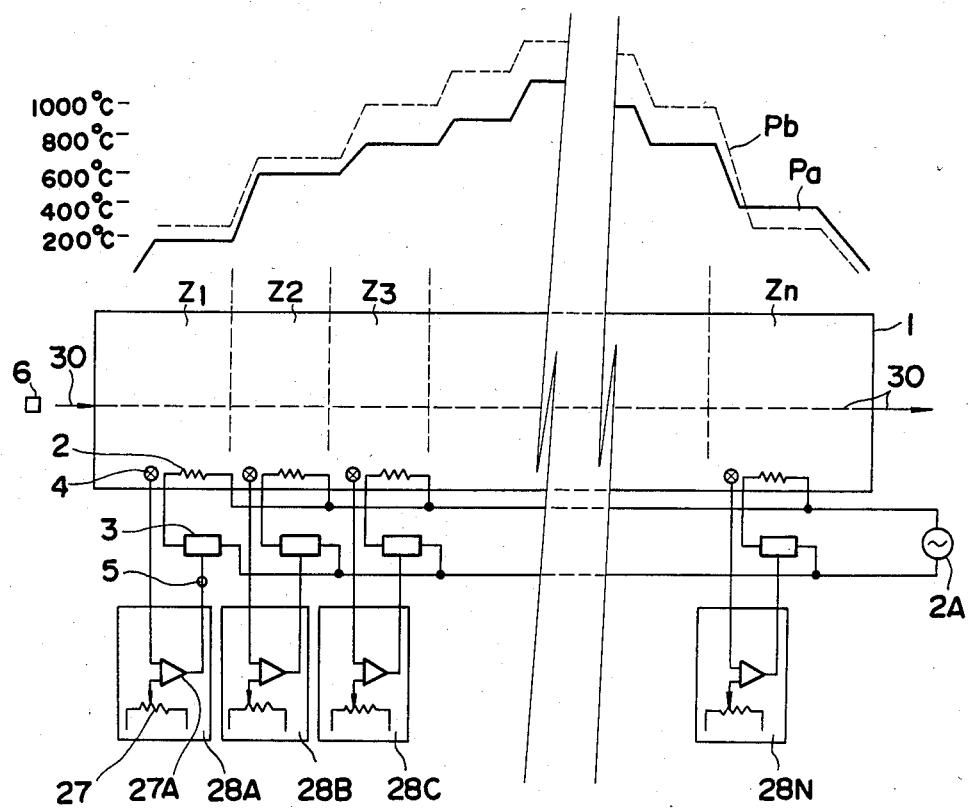
FIG. 2 is a schmatic diagram of a conventional temperature control apparatus for a furnace.

For a furnace having a long time constant of temperature change, a suitable number dummy bodies 14 (FIG. 5) may be inserted between the works 6 of kind A and the works 6 of kind B to be heat-treated at different temperatures. With the dummy bodies 14 thus inserted, the works 6 to be heat-treated at a newly changed temperature may be loaded in the furnace 1 only after feeding the dummy bodies 14 therein during the time interval necessary for the furnace to change its temperature. When the dummy bodies 14 are used, the temperature control apparatus 15 may include a selective driving means 70 for selectivity driving either a work line 11 or a dummy line 12 (FIG. 5).

Essential functions of the temperature control apparatus of the invention will be explained now by referring to FIGS. 4, 7 and 8. In the graph (a) of FIG. 4, it is assumed that the temperature distribution pattern P1 is for treating the kind A works 6 and the temperature distribution pattern P2 is for treating the kind B works 6. When the heat treatment of the works 6 in the furnace 1 begins, the work detector 7 sends a work signal 8 to the bus 25 of the temperature control apparatus 15 each time one work 6 is moved toward the furnace 1. The counting means 45 counts the work signals 8.

During the heat treatment at a certain temperature distribution pattern, if the count of work signals 8 at the counting means 45 is less than the prescribed number of the works 6 for treatment at that certain temperature distribution pattern, which number is stored in the memory 20, and if there is no change in the kind of the work at any of the zones Z1 through Z5 as the works 6 proceeds in the furnace 1, then neither the setting means 60 nor the dummy line 12 actuates, and the regulating means 50 operates with the prevailing set values in the temperature setting elements 40 and the actual temperatures detected by the temperature detectors 4.

On the other hand, during the heat treatment with a certain temperture distribution pattern, if the count of work signals 8 at the counting means 45 coincides with the prescribed number of the works 6 stored in the memory for treatment at that certain temperature distribution pattern, the setting means 60 reads out a subsequent temperature distribution pattern which is stored in the memory 20 next to the above certain temperature distribution pattern and places the thus read temperature distribution pattern on the temperature setting element 40 zone by zone.

For example, referring to FIG. 4 and FIG. 7, if the counting means 45 counts up the prescribed number of the kind A works 6, and the work detector 7 detects the leading one of the dummy bodies 14, then that portion $P2_1$ of the temperature distribution pattern P2 for the kind B works 6 which corresponds to the zone Z1 is read out from the memory 20 onto the temperature setting element 40. With the new set value placed on the temperature setting element 40, the regulating means 50 controls the heating elements 2 in the above-mentioned manner. If the time constant of temperature change in the furnace 1 is negligible, the dummy bodies 14 in the above description may be replaced with the kind B works 6, because under such conditions the kind B works 6 can be forwarded to the furnace 1 immediately after the last kind A work 6 in the series without inserting any dummy bodies 14 therebetween.

The time when the leading one of the kind B works 6 of FIG. 4 reaches any zone Zi can be determined indirectly by measuring the time interval from the moment of detecting the leading kind B work 6 by the work detector 7 until the time when the counting means 45 counts a certain number, for instance m, of the kind B works 6 passing under the work detector 7. The number m depends on the size of the kind B works 6, the length of each zone Z1 through Zn, the position of the specific zone Zi in the furnace 1, and the distance from the work detector 7, to the first zone Z1.

When, for instance, it is only the zone Z2 where the incoming work and the outgoing work are different from each other, that is, the kind A work 6 leaves while a dummy body 14 enters at a certain moment, the portion $P2_2$ of the temperature distribution pattern P2 for the kind B work 6 is read out from the memory 20 onto the temperature setting element 40. In this case, if the time constant of temperature change in the furnace 1 is negligible, the aove dummy body 14 can be replaced with a kind B work 6 or a work 6 of the next succeeding kind. Thus, a temperature distribution pattern as shown in the curve (b) of FIG. 4 is placed on the temperature setting element 40 as the set values thereof. The regulating means 50 controls the heating elements 2 through the regulating means 3 while using such set values of the temperature setting element 40.

In short, as a row of the works 6 and/or dummy bodies 14 move by one step on the treating line 30 of FIG. 1, the work detector 7 detects one work 6 or dummy body 14 which follows the previously detected work 6 or dummy body 14, and the counting means 45 determines whether any change occurs in the kind of works and/or dummy bodies at any zone. Only when any change of work kind is found at any zone, the set values on the temperature setting element 40 are modified in the above-mentioned manner. The regulating means 50 continues the control of the furnace temperature with the modified or non-modified set values on the temperature setting element 40. Thus, one cycle of control action of the temperature control apparatus 15 is completed. Then, similar actions to the above are repeated each time the row of the works 6 and/or dummy bodies 14 move by one step in response to the application of the work signal 8 to the bus 25 of the apparatus 15.

If the optimal control parameters for each zone for each work kind are stored in the memory 20 together with the temperature distribution patterns, such optimal control parameters are read out from the memory 20 onto the regulating means 50 zone by zone as the temperature distribution pattern of the corresponding zones are read out. Thus, the furnace temperture is controlled with the optimal control parameters.

Accordingly, if information concerning the quantities and the sequence of different kinds of works 6 and the dummy bodies 14 in terms of a series of numbers representing quantities of the aligned works and the dummy bodies is stored in the memory 20, it is possible to selectively drive the work line 11 or the dummy line 12 of FIG. 5 by the selective driving means 70 of the control apparatus 15 in response to the work signal 8 from the detector 7.

In the case that a selective driving means 70 is provided, a further modification is possible. Namely, a temperature comparing means 46 (FIG. 7) may be provided in the temperature control apparatus 15, so that when the counting means 45 counts up the prescribed number of works 6 and a new temperature distribution pattern is read out from the memory 20, the temperature comparing means 46 determines the temperature difference $\Delta t$ between the actual temperature of the inlet end zone Z1 of the furnace 1 and the set value for that zone Z1 of the newly read temperature distribution pattern. Then, the selective driving means 70 may forward the dummy bodies 14 into the furnace 1 until the above temperature difference $\Delta t$ becomes less than a certain allowable limit.

Practical examples of the temperature control apparatus 15 of the invention will be described now. Referring to FIG. 1, the heating element 2 is disposed in each zone Z1 through Zn of a so-called tunnel furnace 1 is controlled by a regulating means 3. In case of such tunnel furnace, it is often required to change the pattern of temperature distribution therein depending on the kind or lot of works 6 to be heat-treated thereby. According to the invention, different temperature distribution patterns for different kinds of works 6 are defined on a zone-to-zone basis and stored in a memory 20. In the example of FIG. 1, three temperature distribution patterns P1, P2 and P3 are stored. A work detector 7 detects the work 6 being forwarded to the furnace 1 and produces a work signal 8 at each such detection, which signal 8 is used for counting the number of works fed to the furnace 1.

In FIG. 3 showing a detailed block diagram of the temperature control apparatus of the invention, a multiplexer 16 serially supplies temperature signals from the temperature detecting elements 4 of the zones Z1 through Zn to a bus 25 through an analog-to-digital (A/D) converter 17. Digital-to-analog (D/A) converters $18_1$ convert digital control signals $5_1$ through $5_n$ on the bus 25 into analog signals and apply them to the regulating means $3_1$ through $3_n$. The bus 25 has a microprocessor (MCRPR) 19, the memory 20, and a display interface 21a connected thereto so as to actuate the temperature control apparatus and a display 21.

The work signals 8 from the work detector 7 are applied to the bus 25 through an input/output interface 23, while input signals from a keyboard 22 are applied to the bus 25 through a keyboard interface 22a.

The operation of the temperature control apparatus 15 of this example will be explained now by referring to FIG. 3 and FIG. 4. The input signals from the temperature detecting elements 4 in the furnace 1 are read through the multiplexer 16 and the A/D converter 17 at suitable time intervals. The regulating means 50, which can be built-in routine in the microprocessor MCRPR 19, effects the comparison of the actual temperature carried by the input signals against set values of a temperature distribution pattern as placed on the temperature setting element 40. The temperature setting element 40 can be a specific memory area in the microprocessor MCRPR 19. The temperature distribution pattern can be set by the keyboard 22 and stored in the memory 20.

The regulating means 50 in the MCRPR 19 produces control signals $5_1$ through $5_n$, which are applied to the regulating means $3_1$ through $3_n$ by way of the bus 25 and the D/A converters $18_1$ through $18_n$, so that the actual temperatures in the zones Z1 through Zn are brought to the above set values of the selected temperature distribution pattern. In the present invention, when the end of heat treatment of one kind of works 6 is detected in the above-mentioned manner, the temperature distribution pattern for heat-treating the next following kind of works 6 is automatically selected and placed on the temperature setting element 40.

More particularly, a number of temperature distribution patterns for heat-treating different kinds of works 6 are stored in the memory 20 of the temperature control apparatus 15 together with the quantities in number of individual kinds of the works 6, and that temperature distribution pattern which for heat-treating a particular kind of works 6 is selected in the manner described above. FIG. 4 shows a transit control stage from the heat treatment of the kind A works 6 to that of the kind B works 6. The quantity of the works 6 is counted for one kind at a time by the work counter 7 at the inlet end of the furnace 1. In the case of the furnace 1 of FIG. 4, the switching of the set values of the temperature distribution pattern from that P1 for the kind A to that P2 for the kind B is initiated zone by zone, starting from that zone which is the last kind A work 6 in the series leaves.

It should be noted that a certain transient period is necessary from the switching of the furnace temperature setting to a new set value until the actual change of furnace temperature to the new set value. If the kind B works 6 is forwarded into the furnace 1 immediately after the last kind A work 6 during such transient period, desired result cannot be achieved. Accordingly, in the example of FIG. 4, dummy bodies 14 are loaded in the furnace 1 during such transient period, and as the furnace temperature at the entry end zone Z1 reaches the newly set value, the kind B works 6 are forwarded to the furnace 1. Whereby, ill effects of the temperature transient period on the works 6 can be avoided.

Fig. 5 shows an arrangement for selectively forwarding the works 6 and the dummy bodies 14. In the figure, a work line 11 and a dummy line 12 are separately provided, and either one work 6 of the work line 11 or one dummy body 14 of the dummy line 12 is selectively brought to the front of a pusher 13. The pusher 13 forwards the thus brought work 6 or the dummy body 14 to the furnace 1 as shown by the arrow M.

In the above description, only the temperature distribution pattern of the furnace is switched. However, if the temperature difference before and after the switching is large, either at certain zones or for the entire furnace, the thermal characteristics of the furnace system may be changed as a result of the switching of the temperature distribution pattern. When such thermal characteristics change is caused, if the above-mentioned P.I.D. control action is taken, one cannot expect good result unless suitable modification is made in the control parameters such as proportional gains (or proportional bands), integral action time constants and derivative time constants. Therefore, it is preferable to store the control parameters together with the temperature distribution patterns and to change the control parameters together with certain switching of the temperature distribution pattern.

Figure 6:
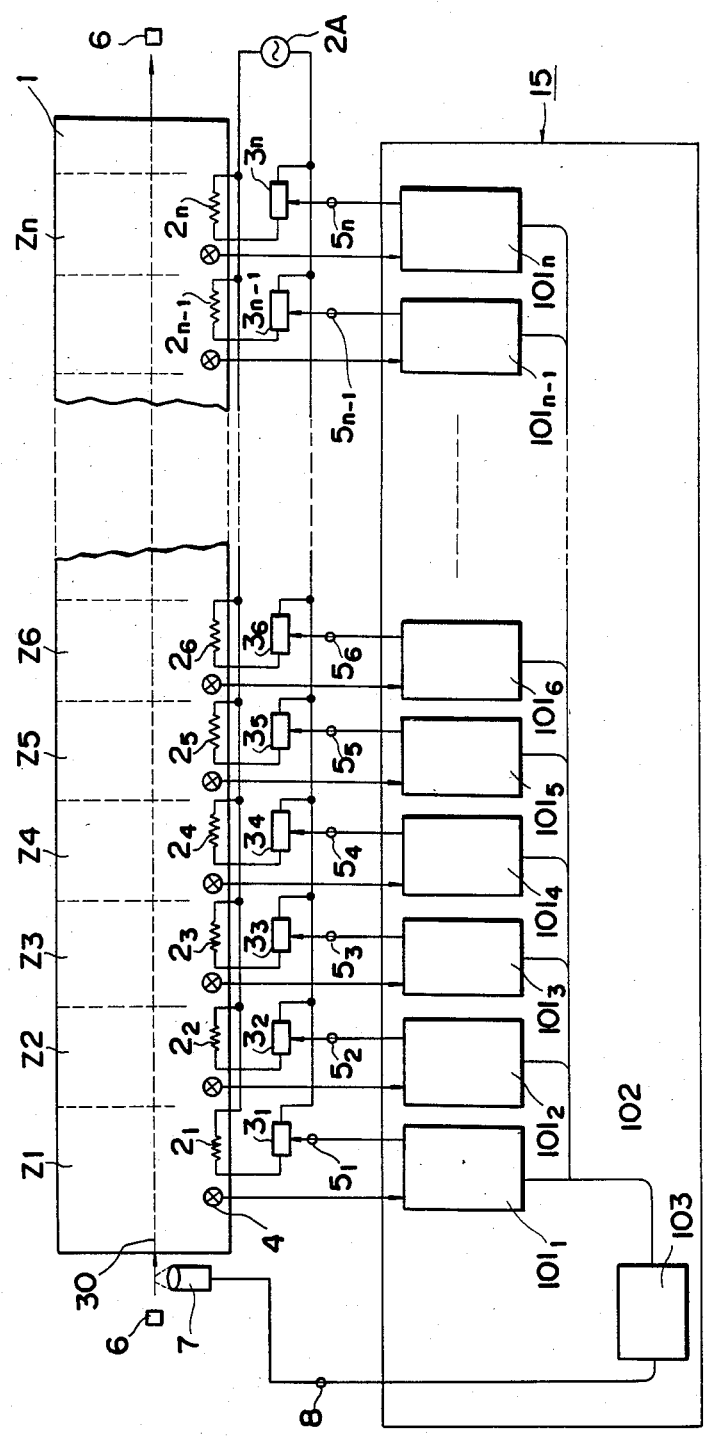
FIG. 6 is a block diagram of another embodiment of the invention which uses a computer.

The example of FIG. 3 uses the so-called multi-loop control system which controls a plurality of loops by a single control apparatus. Recently, controllers of distributed type, such as the so-called single-loop or one-loop type, have been used increasingly. FIG. 6 shows an example of the temperature control apparatus of the invention using distributed controllers. Zones Z1 through Zn of the furnace 1 of this example are controlled by individual single-loop controllers $101_1$ through $101_n$ respectively, which controllers are connected to a common computer 103 through transmission lines 102. In this example, the work signal 8 from the work detector 7 is directly applied to the computer 103.

In the example of FIG. 6, the computer 103 has a memory which stores various control data, such as the different temperature distribution patterns, the control parameters corresponding thereto, and the quantities of the works 6 to be heat-treated at each of the different temperature patterns. Accordingly, each single-loop controller receives various constants, such as temperature set values and control parameters, from the computer 103 through the transmission line 102 so as to carry out proper control action based on the thus received constants. When the temperature distribution pattern is switched, the individual controllers serially receive the set values of the new temperature distribution pattern from the computer 103, together with associated control parameters if any. Thereafter, the control is performed with the newly received data, so that the same temperature control as that of the example of FIG. 3 can be effected.

As described in the foregoing, a pattern-switching temperature control apparatus according to the invention stores a number of temperature distribution patterns for a multi-zone furnace and automatically switches the thus stored temperature distribution on a zone-by-zone basis, so that the following effects are achieved.

(a) The set values for temperature distribution pattern in the temperature and control apparatus can be quickly modified without interrupting the heat treatment in the furnace, so that the speed of work heat treatment is considerably improved.

(b) The furnace can be run continuously even during the modification of the temperature distribution pattern, so that the utility of the furnace is improved.

(c) The temperature control apparatus automatically switches the set values for temperature dsitribution pattern, and the cumbersome manual operation is eliminated to save labor therefor.

(d) The temperature control apparatus eliminates time lag which is intrinsic to manual switching of set values and facilitates proper modification of settings in time, so that precise temperature control system is made possible.

(e) The temperature control apparatus can be computerized so as to cope with a large amount of data such as temperature distribution patterns, and it suits to a large system having many temperature control points.

What is claimed is:

1. A pattern-switching temperature control apparatus for a furnace with a number of zones, each zone having a temperature detecting element and a heating element mounted thereon, comprising
    a memory storing a series of inside temperature distribution patterns for the furnace and a series of numbers, each of which numbers represents a predetermined quantity of works of one kind to be heat-treated in the furnace at corresponding one of said temperature distribution patterns;
    a temperature setting element on which one of said inside temperature distribution patterns is placed zone by zone;
    a counting means for counting the number of those works of one kind which have been heat-treated at one of said temperature distribution patterns;
    a setting means adapted to reset said counting means to zero and to place a next succeeding one of said inside temperature distribution patterns from said memory when count of said counting means coincides with said predetermined quantity of said one kind of works; and
    a regulating means adapted to control said heating element depending on difference between said inside temperature distribution pattern stored in the temperature setting element and actual temperature detected by said temperature detecting element zone by zone.

2. A pattern-switching temperature control apparatus as set forth in claim 1, wherein said regulating means is a multi-loop regulator adapted to generate control signals to the heating elements at different zones of said furnace.

3. A pattern-switching temperature control apparatus as set forth in claim 1, wherein said regulating means consists of a plurality of controllers associated with the furnace zones respectively, each controller having a temperature setting element adapted to carry a corresponding furnace zone portion of each temperature distribution pattern, a computer having said memory and a means to transmit said temperature distribution patterns, and a transmission line extending between the computer and said controllers.

4. A pattern-switching temperature control apparatus as set forth in claim 1, wherein said memory further stores control parameters for each kind of works and said setting means reads out the control parameters from the memory onto said regulating means each time said temperature distribution pattern is read out of said memory, both the control parameters and the temperature distribution pattern read out from the memory at one time being for the same kind of works.

5. A pattern-switching temperature control apparatus as set forth in claim 4, wherein said regulating means is a multi-loop regulator adapted to generate control signals to the heating elements at different zones of said furnace.

6. A pattern-switching temperature control apparatus as set forth in claim 4, wherein said regulating means consists of a plurality of controllers associated with the furnace zones respectively, each controller having a temperature setting element adapted to carry a corresponding furnace zone portion of each temperature distribution pattern and a control parameter element adapted to carry control parameters for the corresponding furnace zone, a computer having said memory and a means to transmit said temperature distribution patterns and said control parameters, and a transmission line extending between the computer and said controllers.

7. A pattern-switching temperature control apparatus as set forth in claim 1, wherein said numbers stored in the memory include one or more numbers representing predetermined quantities of dummy bodies to be placed between different kind works to be heat-treated.

8. A pattern-switching temperature control apparatus as set forth in claim 7, wherein said apparatus further comprises a selective driving means adapted to selectively forward either works or dummy bodies to the furnace depending on whether said counting means counts up one of said numbers representing either dummy bodies or works.

9. A pattern-switching temperature control apparatus as set forth in claim 8, wherein said apparatus further comprises a temperature comparing means adapted to determine, when one of said temperature distribution patterns is newly placed on the temperature setting element, a temperature difference between furnace inlet end temperature of thus placed temperature distribution pattern and actual temperature of furnace inlet end zone detected by the temperature detecting element thereat, and said comparative driving means being adapted to forward dummy bodies to the furnace as long as the temperature difference thus determined by the temperature comparing means is larger than a certain preset value.

* * * * *

UNITED STATES PATENT AND TRADEMARK OFFICE
CERTIFICATE OF CORRECTION

PATENT NO. : 4,605,161

DATED : August 12, 1986

INVENTOR(S) : MOTOMIYA, Takehiko et al.

It is certified that error appears in the above-identified patent and that said Letters Patent is hereby corrected as shown below:

-- Title Page:

The second Applicant information is incorrect, should read as follows:

SHIGERU OGAWA, Tokyo, Japan --

Signed and Sealed this

Fourth Day of November, 1986

[SEAL]

Attest:

DONALD J. QUIGG

*Attesting Officer*   *Commissioner of Patents and Trademarks*